United States Patent
Shah et al.

(10) Patent No.: US 11,989,661 B1
(45) Date of Patent: May 21, 2024

(54) DYNAMIC RULES FOR RULES ENGINES

(71) Applicant: Morgan Stanley Services Group Inc., New York, NY (US)

(72) Inventors: Monil Shah, Jersey City, NJ (US); Sandeep Verma, Mumbai (IN); Paul Cherian, Mumbai (IN)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/357,821

(22) Filed: Jul. 24, 2023

(51) Int. Cl.
*G06N 5/025* (2023.01)
*G06F 9/54* (2006.01)

(52) U.S. Cl.
CPC ............ *G06N 5/025* (2013.01); *G06F 9/542* (2013.01); *G06F 2209/547* (2013.01)

(58) Field of Classification Search
None
See application file for complete search history.

(56) References Cited

U.S. PATENT DOCUMENTS

| | | | |
|---|---|---|---|
| 10,621,523 B1 | 4/2020 | Chadha et al. | |
| 10,867,351 B1 | 12/2020 | Vadaparty et al. | |
| 10,951,737 B1 | 3/2021 | Vadaparty et al. | |
| 11,341,575 B1 | 5/2022 | Vadaparty et al. | |
| 11,386,058 B2 | 7/2022 | Hung et al. | |
| 2007/0260470 A1 | 11/2007 | Bornhoevd et al. | |
| 2008/0320552 A1* | 12/2008 | Kumar | H04L 63/1433 726/1 |
| 2009/0271214 A1* | 10/2009 | Kandasamy | G06Q 40/08 705/2 |
| 2012/0089549 A1* | 4/2012 | Burckart | G06N 5/02 706/47 |
| 2017/0126768 A1 | 5/2017 | Tucker | |
| 2018/0212830 A1 | 7/2018 | Wagstaff et al. | |
| 2020/0073730 A1 | 3/2020 | Jannu et al. | |
| 2023/0006890 A1 | 1/2023 | Allsbrook et al. | |

FOREIGN PATENT DOCUMENTS

| | | | | | |
|---|---|---|---|---|---|
| CN | 106101090 A | * | 11/2016 | ............ | H04L 67/01 |
| CN | 109783071 A | * | 5/2019 | | |
| CN | 111258628 A | * | 6/2020 | ............ | G06F 8/73 |
| CN | 115358402 A | * | 11/2022 | ............ | G06F 8/447 |
| IN | 2950/CHE/2014 A | * | 1/2016 | | |

* cited by examiner

*Primary Examiner* — Charles E Anya
(74) *Attorney, Agent, or Firm* — K&L Gates LLP (57) ABSTRACT

Computer-implemented systems and methods update rules engines in a distributed computer system with new rules in a lightweight, non-intrusive, real-time manner. Rules engines are subscribed to a pub/sub service for new rules pertaining to a topic. A rules manager publishes a new rule to the pub/sub service with an associated topic. The rules engines download the new rule and store the new rule in-memory for execution without downtime.

21 Claims, 5 Drawing Sheets

DYNAMIC RULES FOR RULES ENGINES

BACKGROUND

A rules engine is a computer system that is programmed, with software, to execute rules for an enterprise in a runtime production environment. A large enterprise typically has many, distributed instances of rules engines through the enterprise that could each be associated with a system of the enterprise whose operation is governed by the rules implemented by the rules engine. For example, a financial services firm might have separate, distributed rules engines for wire transfers by its clients, stock trades by its client, account creation for its clients, etc. The rules engine for the wire transfer system, for example, dictates the circumstances, or rules, under which the wire transfer system can, or cannot, make a wire transfer on behalf of a client of the financial services firm, and so on. The rules for some of the rules engines can change frequently, such as due to changing regulations, changing policies of the enterprise, and/or to respond to fast-changing circumstances, such as potential fraudulent activity. Some new rules might apply to many instances of the rules engines, whereas other new rules might apply to just some in a distributed system. Updating rules typically requires downtime for the rules engine that are to be updated and deployed with the new rules, which increases significantly the lead-time for effectuating new rules, which impacts the availability and resiliency of mission critical system for the enterprise. This also makes implementing urgent rules extremely difficult in a distributed system.

SUMMARY

In one general aspect, the present invention is directed to computer-implemented systems and methods for updating rules engines, in a distributed computer system of an enterprise, with new rules in a lightweight, non-intrusive, real-time manner. The distributed computer system can comprise a rules engine comprising RAM, where the RAM stores instantiations of rules for the enterprise that are implemented by the rules engine. The distributed system also comprises a rules manager that is programmed to generate new rules for the enterprise. The distributed system also comprises a pub/sub service that is in communication with the rules engine and the rules manager. The rules engine is subscribed to the pub/sub service for new rules pertaining to a first topic. The rules manager is configured to publish a new rule to the pub/sub service with an associated topic for the new rule. The rules engine is configured to poll the pub/sub service for new rules and, upon the rules engine determining, from the polling, that the new rule from the rules engine is for the first topic, downloading the new rule and storing new rule in the RAM for execution of the new rule by the rules engine without downtime of the rules engine. Any other rules engines in the distributed system that subscribes to the topic for the new rule can also download into RAM and deploy rapidly the new rule in the same manner. These and other benefits that can be realized through embodiments of the present invention will be apparent from the description that follows.

DRAWINGS

Various embodiments of the present invention are described herein by way of example in connection with the following figures.

DESCRIPTION

Figure 1:
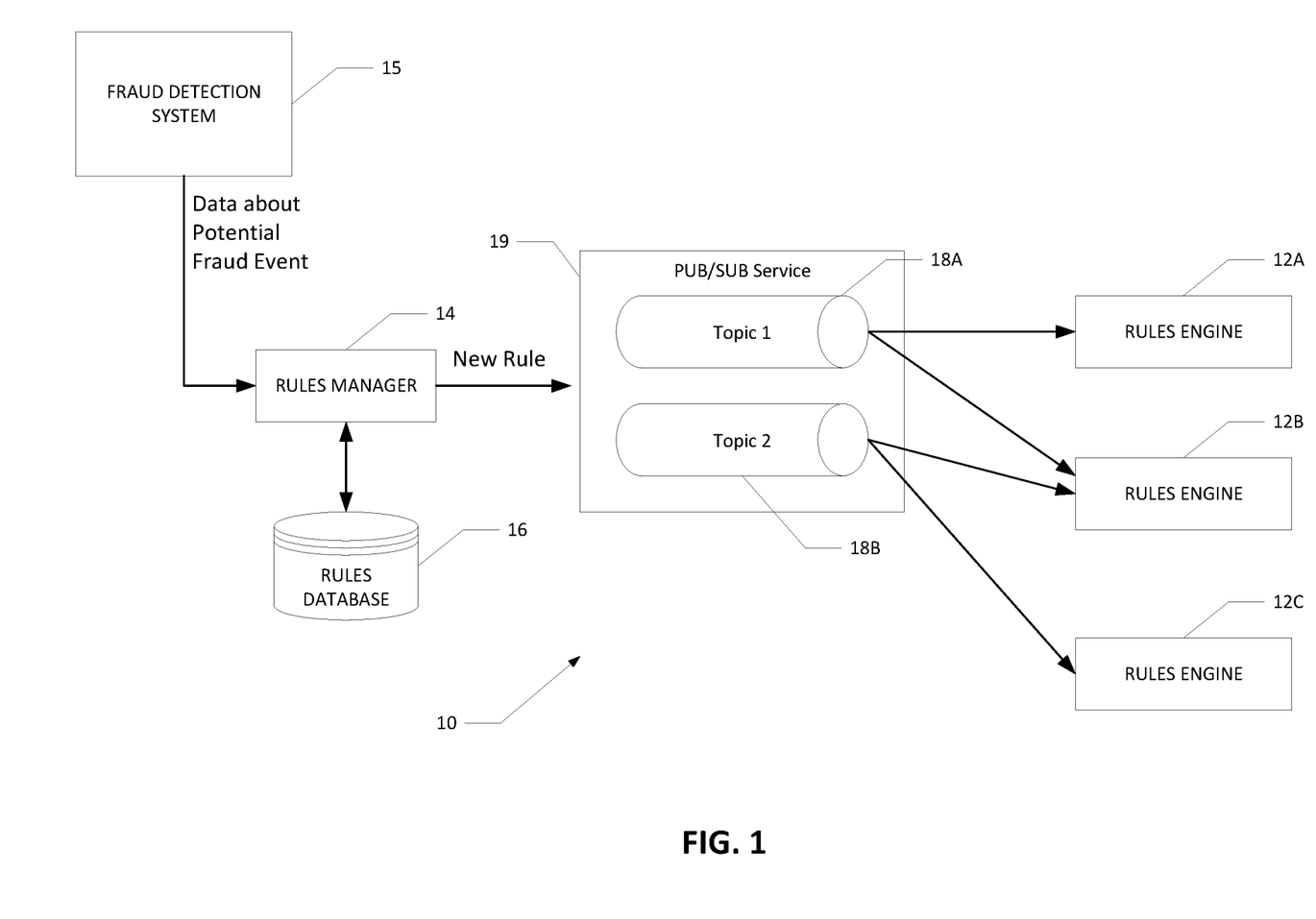
FIG. 1 is a block diagram of a distributed system according to various embodiments of the present invention that comprises a rules manager that publishes new rules for rules engines within the distributed system.

Various embodiments of the present invention are directed to systems and methods for dynamically effectuating new rules to be implemented by rules engines of an enterprise, particularly an enterprise with distributed rules engines and for an enterprise that, under some circumstances, needs new rules to be implemented urgently to, for example, combat an urgent, dynamic issue, such as a potentially ongoing fraud event. FIG. 1 illustrates a distributed system 10, such as for an enterprise, which has several different, distributed rules engines 12A-C. The illustrated shows three rules engines for illustrative purposes and the distributed system 10 may have more or fewer rules engines in a practical application of the present invention. The rules engines 12A-C may implement rules for different systems of the enterprise. For example, in the context of a financial services firm, the first rules engine 12A may implement rules for a wire transfer system of the financial services firm that executes wire transfers on behalf of firm clients; the rules engine 12B may implement rules for trading securities (e.g., stock and bonds) on behalf of the firm clients; and rules engine 12C may implement rules for opening or modifying accounts for clients of the financial services firm. Of course, this is merely an illustrative example and the distributed system 10 may have many other rules engines and for different systems of the enterprise.

Figure 2:
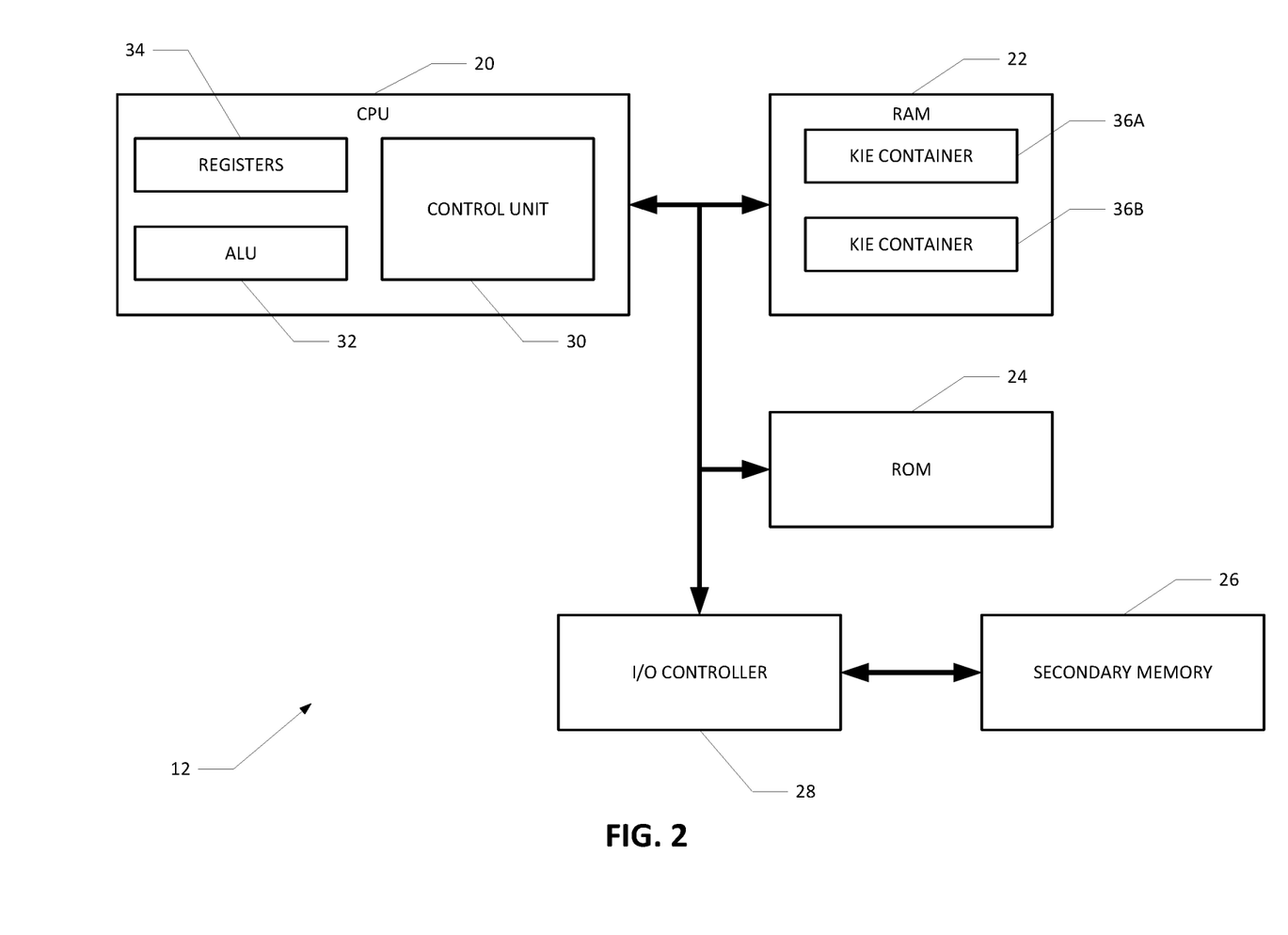
FIG. 2 is a block diagram of a rules engine according to various embodiments of the present invention.

The rules engines 12A-C may each be implemented by a computer device (e.g. a server) 12, or a set of inter-networked computer devices, that comprise, as shown in the example of FIG. 2, one or more processors, e.g., CPU(s) 20, in addition to computer memory. The computer memory includes primary memory, such as RAM 22 and ROM 24. The rules engine 12 might also include secondary memory 26, such as a HDD, that is connected to the CPU 20 via an I/O controller 28. The rules engines 12A-C may also communicate with the associated system (e.g., wire transfer system, etc.) (not shown) via application programming interfaces (APIs).

The rules engine's memory may store software, including the rules, that is executed by the CPU 20 to implement the rules. In various embodiments, one or more of the rules engines 12A-C may be a "Drools" rules engine. Drools is an open source rules engine, written in Java, that has its own syntax for writing rules, sometimes called "DRLs," in a declarative, concise, and unambiguous format. A Drools rules engine may run on any Java virtual machine (JVM). More details about Drools can be found at www.drools.org, and the user guide for version 8.39.0, available at docs-.drools.org/8.39.0.Final/drools-docs/docs-website/drools/introduction/index.html, is incorporated herein by reference in its entirety. The rules engines 12A-C can also be programmed using object-oriented programming (OOP) in Java to, using objects and classes, improve code readability and reusability by defining a Java program efficiently.

In FIG. 1, the distributed system 10 also includes a rules manager 14. The rules manager 14 is a computer-based system that can create a new rule in response to an input to the rules manager 14 about, for example, a potential fraud event from a fraud detection system 15 of the enterprise; store the new rule in a rules database 16; and publish the new rule via a publication-subscription (pub/sub) service 19, such as using Apache Kafka or some other suitable pub/sub service, to all instances of rules engines 12A-C in the distributed system 10 that subscribe, via the pub/sub service, to the topic or channel of the new rule. That way, multiple instances of the rules engines 12 deployed and running in the distributed system 10 that subscribe to the topic/channel for the new rule can consume and deploy the new rules. A pub/sub service can decouple the application that sends a message, in this case a new rule from the rules manager 14, from the systems that consume (or subscribe to) the messages, in this case the rules engines 12A-C. This arrangement allows for an asynchronous communication model: it removes or mitigates the delays and impedances associated with direct, synchronous communication between the rules manager 14 and the rules engines 12A-C. In this example, therefore, the rules engines 12A-C can subscribe to new rules published by the rules manager 14, although a rules engine only consumes a published rule if the published rule relates to a topic that is relevant to the rules engine. Two topics 16A-B are shown in FIG. 1 for illustrative purposes, but in practical applications, the rules may relate to many topics. In the illustrated embodiment, the rules engines 12A-B subscribe to rules about Topic 1 and the rules engines 12B-C subscribe to rules about Topic 2. In this example, if the rules manager 14 publishes a first new rule pertaining to Topic 1, both rules engines 12A-B can receive and deploy the new rule. Similarly, if the rules manager 14 publishes a second new rule pertaining to Topic 2, both rules engines 12B-C can receive and deploy the new rule.

The pub/sub service 19, e.g., Kafka, can run as a cluster, with the nodes of the cluster being called brokers (not shown). A message is a unit of data in Kafka. Each message is represented as a record, which comprises two parts: key and value. The key is commonly used for data about the message and the value is the body of the message. Kafka uses the terms record and message interchangeably.

Figure 3:
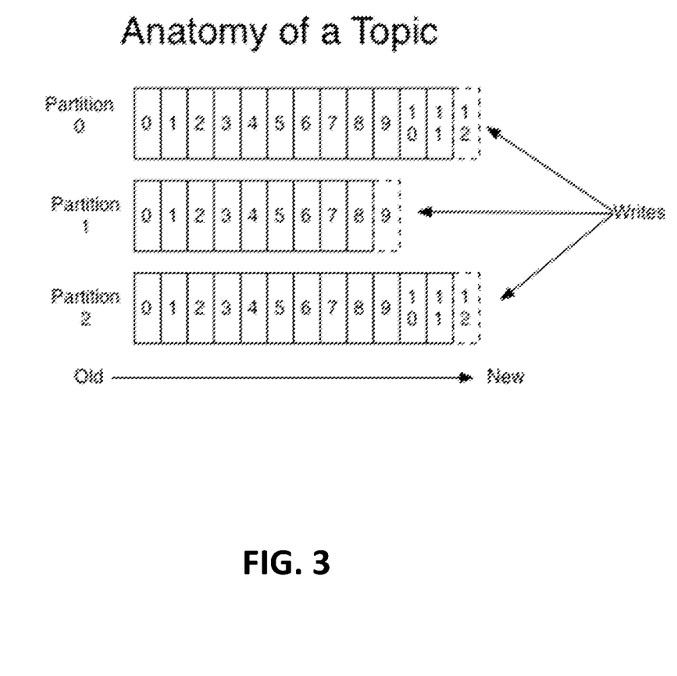
FIG. 3 depicts an anatomy of a topic in a publication-subscription messaging service according to various embodiments of the present invention.

Each topic is a named stream of messages. A topic is made up of one or more partitions, as shown in FIG. 3. The messages on a partition are ordered by a number that is called the offset. With multiple partitions distributed across the brokers, the scalability of a topic is increased. If a topic has more than one partition, such as shown in the example of FIG. 3, it allows data to be fed through in parallel to increase throughput by distributing the partitions across the cluster. The partitions can be immutable in the sense that the rules manager 14 appends messages to a partition without changing the values for an existing record (i.e., with the same key). The number of partitions also influences the balancing of workload among consumers, e.g., rules engines 12A-C. To improve availability, each topic can be replicated onto multiple brokers. For each partition, one of the brokers is the leader, and the other brokers are the followers.

A producer, e.g., the rules manager 14, publishes messages to one or more topics. The rules manager 14 can publish to one or more topics and can optionally choose the partition that stores the data. The rules engines 12A-C can subscribe to topics that pertain to it. After subscribing, the rules engines 12A-C poll the pub/sub service 19, e.g., periodically, to see if there are new records. If there are, the rules engines 12A-C can read the new records/messages from the pub/sub service 19 and process them. As such, the rules manager 14 does not need to know or track a destination address on the enterprise's computer network for the rules engines that subscribe to a particular topic. And the rules manager 14 does not need to send the new rules directly to the affected rules engines. Instead, the rules manager 14 can publish the rule to the pub/sub service 19 according to the topic(s) for the new rule, and all instances of the rules engines in the distributed system 10 that subscribe to that topic can pull the new rules when then they poll the pub/sub service 19 and discover that there is a new rule to download.

Referring back to FIG. 2, the CPU 20 of the rules engine 12 may comprise, among other things, a control unit 30, an arithmetic and logic unit (ALU) 32, and registers 34. The control unit 30 can receive orders from RAM 22 in the form of instruction and decode (e.g., break) that instruction down into specific commands for other components inside computer system 12. The ALU 34 can perform mathematical and logical calculations and operations for the CPU 20. The registers 34 can be small, fast data storage units inside the CPU 20. Also as shown in FIG. 2, the RAM 22 may include, in various embodiments, Kie (Knowledge is Everything) containers, such as Kie container 36A and Kie container 36B. A Kie container is a self-contained environment in the RAM 22 that has been provisioned to hold instances of packaged and deployed rule instances, such as for example the DRL rules from the rules manager 14. In that sense, a Kie container can be an in-memory (e.g., in RAM 22) instantiation of a kjar (a standard Java archive (JAR) file that has some extra fields included), allowing for the instantiation and usage of its assets (domain models, processes, rules, etc.). A Kie container can be updated without restarting the rules engine 12. In preferred embodiments of the present invention, a new rule that is broadcast by the rules manager 14 via the pub/sub service 19 is stored in a Kie container, e.g., Kie container 36B, of the RAM 22. Existing rules, i.e., rules prior to publication of the new rule, can be stored in another Kie container, e.g., Kie container 36A. That way, when a new rule is published and subscribed to by the rules engine 12, the rules engine 12 can read the new rule from the pub/sub service 19 and create a new Kie container 36B in the RAM 22 for the new rule. The rules engine 12 is updated in this way with the new rule in a non-intrusive manner, e.g., the existing Kie container 36A is not affected, in real-time, and without any downtime of the rules engine 12. For example, the rules engine can use the rules in the existing Kie container 36A for processes that were kicked-off prior to creation of the new Kie container 36B, and use the new Kie container 36B for processes that are kicked-off after creation of the new rule (stored in the Kie container 36B). Further, because the Kie container 36B for the new rule is stored in memory, e.g., in RAM 22 that is directly accessible by the CPU 20, there is essentially no downtime in the rules engine 12 implementing the new rule.

Figure 4:
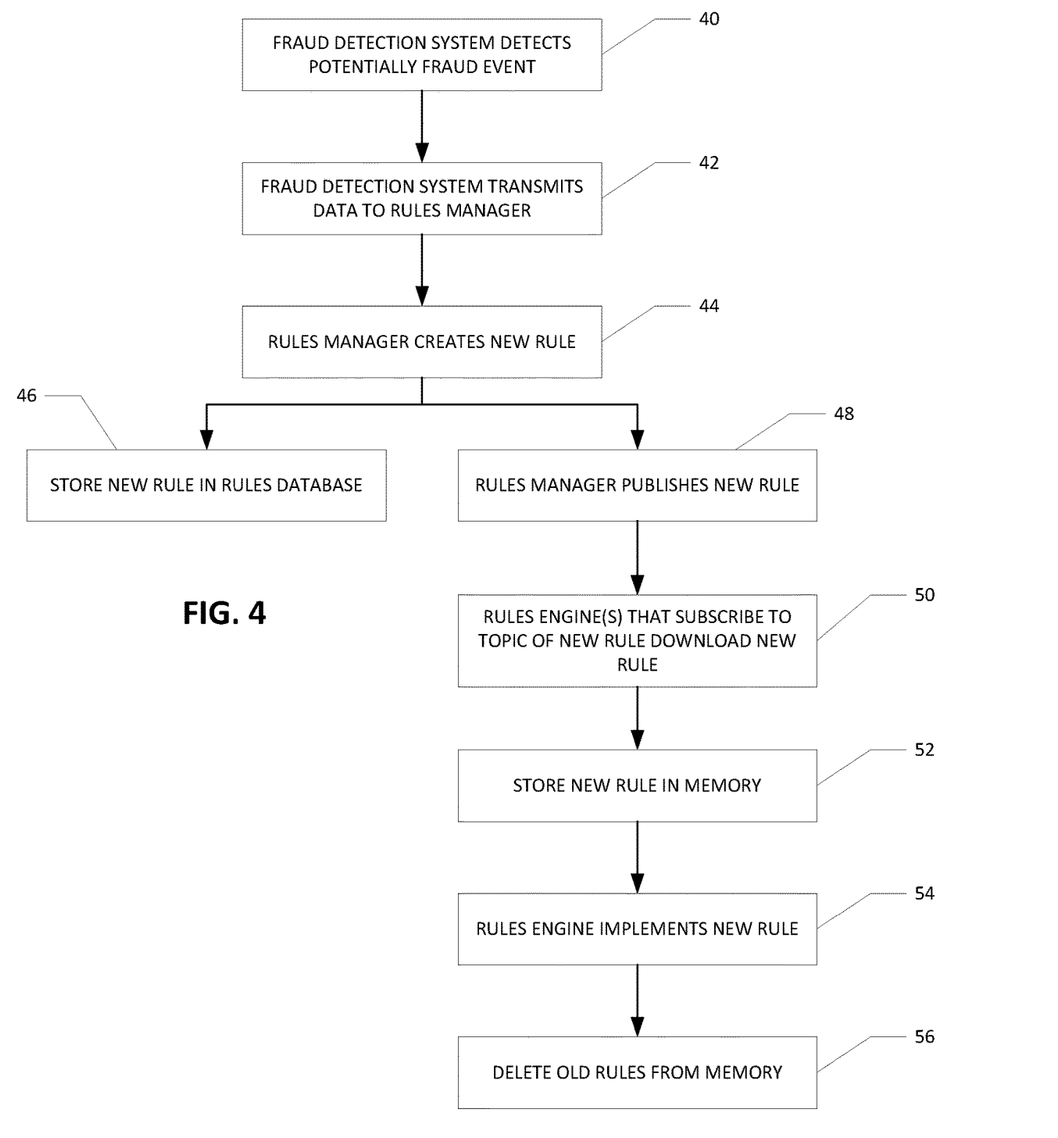
FIG. 4 is a flowchart of a process performed by the distributed system of FIG. 1 according to various embodiments of the present invention.

In that way, the distributed system 10 can implement business rule changes in a rapid, yet effective manner, which is especially beneficial in responding to a potentially inchoate or ongoing fraud event. FIG. 4 is a flow chart of a process that the distributed system 10 can employ according to various embodiments is response to a potentially ongoing fraud event. At step 40, the fraud detection system 15 of the enterprise detects a potentially fraudulent event. This example assumes that the enterprise implementing the process shown in the example of FIG. 4 is a financial services firm. The potentially fraudulent event might be, for example, a potentially compromised email to the financial services firm from what purports to be a client of the enterprise. The fraud detection system 15 might detect that the incoming email is potentially comprised because of name/sender spoofing, internet headers for the email, etc. In that connection, the financial services firm may have a computer-based fraud detection system 15 that is programmed to scan incoming emails to the firm to detect potentially fraudulent ones. At step 42, the fraud detection system 15 transmits data about the potential fraud event to the rules manager 14. The fraud detection engine 15 may be in data communication with the rules manager 14 via an electronic data network, such as the Internet, a LAN, a WAN, etc. The data sent to the rules manager 14 might include, in this example, the name, account number(s) of the firm client whose email was potentially compromised, and a time stamp. The data sent to the rules manager 14 might also be according to a pre-established format so that, at step 44, the rules manger 14 can quickly ingest the data and create the new rule, such as a DRL-formatted rule. In this example, the new rule might be to block trades or other transactions involving the account(s) of the client for a period of time, such as a time period that extends 10 or 15 minutes or so from the time stamp. In this time, the financial services firm can investigate further whether the client email was in fact compromised, and the new rule that blocks trades and transactions for the short time window prevents potentially fraudulent transactions from the client's account for the short time window while the investigation takes place.

At step 46, the rules manager 14 can store the new rule in the rule database 16. At step 48, the rules manager 14 can publish the new rule via the pub/sub service 19. That way, at step 50, any rules engine 12 deployed and running in the distributed system 10 that subscribes to the topic of the new rule can download the new rule and, at step 52, store the new rule in memory, e.g., in the Kie container 36B of the rules engine's RAM 22. That way, at step 54, any rules engine 12 that downloads and stores the new rule in such a manner could execute the new rule stored in the Kie container 36B going forward, without the rules engine 12 having to be otherwise re-programmed and without the rules in the existing Kie container 36A having to be modified. As mentioned before, any processes that the rules engine 12 kicked off prior to the new rule may be run and completed under the then-existing rules in the Kie container 36A, with the new rule in the Kie container 36B being implemented on a going forward basis after it is stored in the RAM 22. Thereafter, at step 56, once all of the processes formerly running under the rules of the Kie container 36A are completed, the Kie container 36A could be deleted in a garbage collection operation to free up space in RAM 22 for new Kie containers for yet newer rules.

Continuing the above example, suppose that a first rules engine 12A is for use with a wire transfer system of the financial services firm and that a second rules engine 12B is for use with a stock trading system of the financial services firm. Further suppose that the new rule is to block transactions from a particular account of a firm client for 15 minutes after a starting time (e.g., YYYY-MM-DDThh:mm.ss.s). Both rules engines 12A-B might subscribe to such a rule and therefore both rules engines 12A-B can download and deploy the new rule. Then, if at step 54 the wire transfer system receives an order to transfer, via wire, funds from the client account within the time window (e.g., less than 15 minutes after the starting time), then the rules engine 12A for the wire transfer system can deploy the new rule and block the wire transfer. Similarly, if at step 54 the stock trading system receives an order to buy or sell shares of a stock for or from the client's account, then the rules engine 12B for the stock trading system can deploy the new rule and block the stock trades. Because of the speed at which the new rule is created and deployed as described above, the new rule can be deployed very rapidly, by all instances of the rules engines in the distributed system that subscribe to the topic/channel for the new rule, after the fraud event is detected at step 40. The quick deployment aspects include: (i) publishing the new rule via a pub/sub model, rather than having the rules manager 14 transmit the new rule to each relevant rules engine in the distributed system; (ii) the applicable rules engine(s) storing the new rule in memory, e.g., in the Kie container(s) 36B of the rules engine's RAM for rapid deployment; (iii) in a rules engine(s) that otherwise uses OOPS; and (iv) the immutable partitions for the topics in the pub/sub messaging. Of course, this use case is an example for illustrative purposes and the system could be used for other uses and applications.

Like the rules engines 12A-C, the rules manager 14 may be implemented with a computer device (e.g., a server), or a set of inter-networked computer devices. The rules manager 14 may include one or more processors and computer memory (e.g., RAM, ROM, secondary memory, etc.). The computer memory stores instructions that when executed by the processor(s) of the rules manager 14, caused the rules manager 14 to perform the functions described herein, such as receiving data for the new rule; creating the new rule, such as in a DRL format; storing the new rule in the rules database 16; and publishing the new rule to the pub/sub service 19, including with the appropriate topic(s) and/or partition(s) for the new rule.

Figure 5:
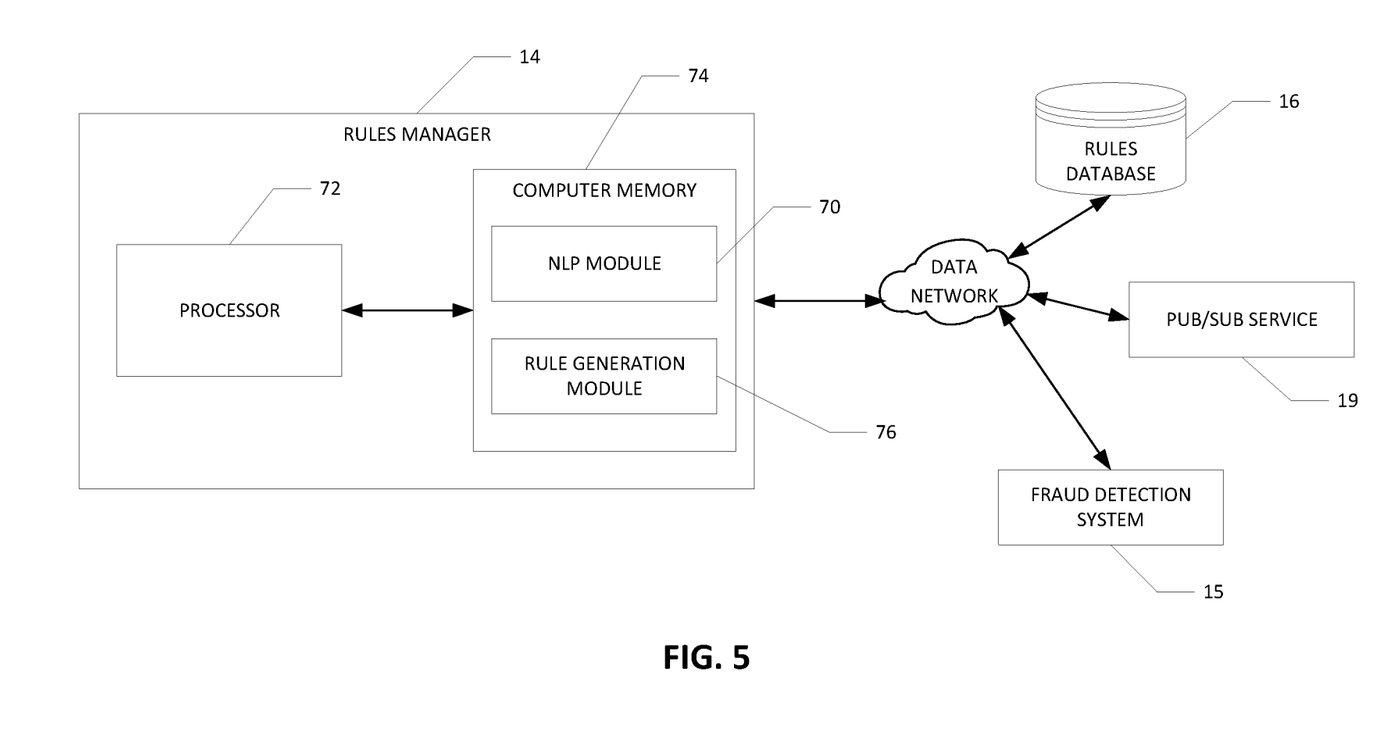
FIG. 5 is a block diagram of a rules manager according to various embodiments of the present invention.

In that connection, the rules manager 14 was described previously as receiving template-formatted data for the new rule, such as from the fraud detection system 15 or other enterprise system that triggers the new rule, so that the rules manager 14 can efficiently generate the new rule in a rule format for the rules engines (e.g., a DRL-formatted rule) from the template-formatted data. In other embodiments, shown as shown in FIG. 5, the rules manager 14 might include a natural language processing (NLP) module 70, which can process non-template formatted data for a new rule to generate the substance of the new rule. That is, for example, as shown in FIG. 5, the rules manager 14 may comprise a processor(s) 72 and a computer memory 74. The computer memory 74 may store software modules, such as the NLP module 70 and a rule generation module 76. When executed by the processor 72, the software of the NLP module 70 can cause the processor 72 to process, using natural language processing, data from a system of the enterprise that triggers a new rule, such as the fraud detection system 15, to identify parameters for a new rule, such as a client account number for which transactions are to be temporarily blocked, such as described above. After identifying this data, the processor 72, executing the software of the rules generation module 76, can generate the new rule (e.g., a DRL rule) and publish it to the pub/sub service 19 and store it in the rules database 16.

The software for the various computer systems described herein (e.g., the rules manager 14 and the rules engines 12A-C) and other computer functions described herein may be implemented in computer software using any suitable computer programming language such as .NET, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C #, COBOL, Fortran, Java, Lisp, Pascal, Object Pascal, Haskell, ML; and examples of scripting languages include Bourne script, JavaScript, Python, Ruby, Lua, PHP, and Perl.

In one general aspect therefore, the present invention is directed to distributed computer systems and methods for an enterprise. In one embodiment, the distributed system comprises a rules engine comprising RAM, where the RAM stores instantiations of rules for the enterprise that are implemented by the rules engine; a rules manager that is programmed to generate new rules for the enterprise; and a pub/sub service that is in communication with the rules engine and the rules manager. The rules engine is subscribed to the pub/sub service for new rules pertaining to a first topic. The rules manager is configured to published a new rule to the pub/sub service with an associated topic for the new rule. The rules engine is configured to poll the pub/sub service for new rules and, upon the rules engine determining, from the polling, that the new rule from the rules engine is for the first topic, downloading the new rule and storing new rule in the RAM for execution of the new rule by the rules engine without downtime of the rules engine.

In another general aspect, method of distributing rules in a distributed system of an enterprise according to various embodiments of the present invention comprises: subscribing, by a first rules engine of the enterprise, with a pub/sub service of the enterprise, to new rules for the enterprise that pertain to a first topic; generating, by a rules manager of the enterprise, a first new rule for the enterprise in response to a first triggering event; publishing, by the rules manager, the first new rule to the pub/sub service, such that the first new rule is associated with the first topic; after publication of the first new rule to the pub/sub service, downloading, by the first rules engine, the first new rule and storing, by the first rules engine, the first new rule in a first RAM of the first rules engine; and after storing the first new rule in the first RAM, executing, by the first rules engine, the first new rule without downtime of the first rules engine.

In various implementations, the new rule comprises a DRL rule. In addition, the rules engine can comprise a Drools rules engine. Still further, the instantiations of rules in the RAM of the rules engine comprise Kie containers. In various implementations, prior to storing the new rule, the RAM comprised a prior Kie container that stored a prior rule. In addition, the rules engine is configured to store the new rule in the RAM in a new Kie container of the first RAM that is separate from the prior Kie container.

In various implementations, the enterprise is a financial services firm and the new rule is to block transactions by a client of the financial services firm for a period of time.

In various implementations, the rules manager is configured to publish the new rule to the pub/sub service without an address for the rules engine.

In various implementations, the distributed system comprises multiple rules engines, where each of the multiple rules engine comprises RAM and is subscribed to the pub/sub services for new rules pertaining to the first topic, such that each of the multiple rules engine is configured to poll the pub/sub service for new rules and, upon the multiple rules engine determining, from the polling, that the new rule is for the first topic, downloading the new rule and storing the new rule in the RAM for the rules engine for execution of the new rule by the rules engine.

In another general aspect, the distributed computer system comprises a first rules engine comprising a first RAM; a second rules engine comprising a second RAM; a rules manager that is programmed to generate new rules for the enterprise; and a pub/sub service that is in communication with the first and second rules engine, and with the rules manager. The first rules engine is subscribed to the pub/sub service for new rules pertaining to a first topic. The second rules engine is subscribed to the pub/sub service for new rules pertaining to a second topic. The rules manager is configured to publish the new rules to the pub/sub service with, for each new rule, at least one associated topic for the new rule. The first rules engine is configured to poll the pub/sub service for new rules and, upon the first rules engine determining, from the polling, that the rules manager published a first new rule for the first topic, downloading the first new rule and storing the first new rule in the first RAM for execution of the first new rule by the first rules engine. The second rules engine is configured to poll the pub/sub service for new rules and, upon the second rules engine determining, from the polling, that the rules manager published a second new rule for the second topic, downloading the second new rule and storing the second new rule in the second RAM for execution of the second new rule by the second rules engine.

In various implementations, prior to storing the first new rule, the first RAM comprised a first prior Kie container that stored a first prior rule for the first rules engine; the first rules engine is configured to store the first new rule in the first RAM in a first new Kie container of the first RAM that is separate from the first prior Kie container; prior to storing the second new rule, the second RAM comprised a second prior Kie container that stored a second prior rule for the second rules engine; and the second rules engine is configured to store the second new rule in the second RAM in a second new Kie container of the second RAM that is separate from the second prior Kie container.

In various implementations, the distributed computer system comprises a third rules engine that comprises a third RAM. The third rules engine is subscribed to the pub/sub service for new rules pertaining to the first topic. The third rules engine is also configured such that, upon the third rules engine determining, from polling the rules manager, that the rules manager published the first new rule, the third rules engine downloads the first new rule and stores the first new rule in the third RAM for execution of the first new rule by the third rules engine.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, although aspects of the present invention are described herein in the context of a financial services firm, other embodiments are not so limited and could be applied to other types of systems where it would be beneficial to distribute new rules to distributed rules engines of an enterprise. Also, although the embodiments described above primarily use Kafka as the pub/sub service 19, other types of pub/sub services may be used. Still further, although embodiments above were described in the context of rules engines that use Drools, the present invention is not necessarily so limited unless otherwise indicated, and can therefore be applied to other types of rules engines and rule formats therefor.

Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A distributed computer system for an enterprise, the distributed computer system comprising:
    a rules engine running on a first computer system comprising random access memory (RAM), wherein the RAM stores, within a first Knowledge is Everything (KIE) container, instantiations of rules for the enterprise that are implemented by the rules engine;
    a rules manager, running in a second computer system, that is programmed to generate new rules for the enterprise; and
    a publish-subscribe (pub/sub) service that provides a communication means between the rules engine and the rules manager,
    wherein:
        the rules engine is subscribed to a topic via the pub/sub service for new rules;
        the rules manager is configured to publish a new rule via the pub/sub service with an associated topic for the new rule; and
        the rules engine is configured to:
            poll the pub/sub service for new rules;
            upon the rules engine determining, from the polling, that the new rule from the rules manager is for the topic, download the new rule;
            store the new rule in a second KIE container of the RAM;
            execute the new rule stored in the second KIE container without downtime of the rules engine; and
            after storing the new rule in the second KIE container, delete the first KIE container.

2. The distributed computer system of claim 1, wherein the new rule comprises a Drool Rule Language (DRL) rule.

3. The distributed computer system of claim 2, wherein rules engine comprises a Drools rules engine.

4. The distributed computer system of claim 1, wherein:
    the enterprise is a financial services firm; and
    the new rule is to block transactions by a client of the financial services firm for a period of time.

5. The distributed computer system of claim 1, wherein the rules manager is configured to publish the new rule to via the pub/sub service without an address for the rules engine.

6. The distributed computer system of claim 1, wherein the distributed system comprises multiple rules engines, where each of the multiple rules engine comprises RAM and is subscribed to the topic via the pub/sub service, wherein each of the multiple rules engine is configured to poll the pub/sub service for new rules and, upon the multiple rules engine determining, from the polling, that the new rule is for the topic, downloading the new rule and storing the new rule in the RAM for the rules engine for execution of the new rule by the rules engine.

7. The distributed computer system of claim 1, wherein:
    the distributed computer system further comprises:
        a first additional rules engine that is subscribed to a first topic but not to a second topic via pub/sub service; and
        a second additional rules engine that is subscribed to the second topic but not the first topic via the pub/sub service,
    wherein:
        both the first and second additional rules engines are configured to poll the pub/sub service for new rules;
        the first additional rules engine is configured wherein, upon the first additional rules engine determining, from the polling, that a first new rule from the rules manager is for the first topic, the first additional rules engine downloads the first new rule and stores the first new rule in RAM of the first additional rules engine for execution of the first new rule by the first additional rules engine; and
        the second additional rules engine is configured wherein, upon the second additional rules engine determining, from polling, that a second new rule from the rules manager is for the second topic, the second additional rules engine downloads the second new rule and stores the second new rule in RAM of the second additional rules engine for execution of the second new rule by the second additional rules engine.

8. A distributed computer system for an enterprise, the distributed computer system comprising:
    a first rules engine running on a first computer system comprising a first RAM, wherein the first RAM stores, within a first KIE container of the first RAM, instantiations of a first set of rules for the enterprise that are implemented by the first rules engine;
    a second rules engine running on a second computer system comprising a second RAM, wherein the second RAM stores, within a first KIE container of the second RAM, instantiations of a second set of rules for the enterprise that are implemented by the second rules engine;
    a rules manager, running on a third computer system, that is programmed to generate new rules for the enterprise; and
    a pub/sub service that provides a communication means between the first and second rules engines and the rules manager,
    wherein:
        the first rules engine is subscribed to a first topic via the pub/sub service;
        the second rules engine is subscribed to a second topic via the pub/sub service;
        the rules manager is configured to publish the new rules via the pub/sub service;
        the first rules engine is configured to:
            poll the pub/sub service for new rules;
            upon the first rules engine determining, from the polling, that the rules manager published a first new rule for the first topic, download the first new rule and store the first new rule in a second KIE container of the first RAM; and
            execute the first new rule stored in the second KIE container of the first RAM without downtime of the first rules engine;
            after storing the first new rule in the second KIE container of the first RAM, delete the first KIE container of the first RAM; and the second rules engine is configured to:
poll the pub/sub service for new rules;
upon the second rules engine determining, from the polling, that the rules manager published a second new rule for the second topic, download the second new rule and store the second new rule in a second KIE container of the second RAM;
execute the second new rule stored in the second KIE container of the second RAM without downtime of the second rules engine; and
after storing the second new rule in the second KIE container of the second RAM, delete the first KIE container of the second RAM.

9. The distributed computer system of claim 8, wherein each of the first and second rules comprises a DRL rule.

10. The distributed computer system of claim 9, wherein the first rules engine comprises a first Drools rules engine and the second rules engine comprises a second Drools rules engine.

11. The distributed computer system of claim 8, wherein:
the enterprise is a financial services firm; and
the first new rule is to block transactions by a first client of the financial services firm for a first period of time.

12. The distributed computer system of claim 8, wherein the rules manager is configured to publish the new rules via the pub/sub service without addresses for the first and second rules engines.

13. The distributed computer system of claim 8, further comprising a third rules engine that comprises a third RAM, wherein:
the third rules engine is subscribed to the first topic via the pub/sub service; and
the third rules engine is configured wherein, upon the third rules engine determining, from polling the rules manager, that the rules manager published the first new rule, the third rules engine downloads the first new rule and stores the first new rule in a KIE container of the third RAM for execution of the first new rule by the third rules engine.

14. A method of distributing rules in a distributed system of an enterprise, the method comprising:
subscribing, by a first rules engine of the enterprise, to a first topic via a pub/sub service of the enterprise for new rules for the enterprise;
generating, by a rules manager of the enterprise, a first new rule for the enterprise in response to a first triggering event;
publishing, by the rules manager, the first new rule via the pub/sub service;
after publication of the first new rule via the pub/sub service:
polling by the first rules engine, the pub/sub service for new rules;
upon determining by the first rules engine, from the polling, that the new rule from the rules manager is for the first topic, downloading, by the first rules engine, the first new rule and storing, by the first rules engine, the first new rule in a first KIE container of a first RAM of the first rules engine; and
after storing the first new rule in the first KIE container of the first RAM, executing, by the first rules engine, the first new rule without downtime of the first rules engine.

15. The method of claim 14, further comprising:
subscribing, by a second rules engine of the enterprise, to a second topic via the pub/sub service;
generating, by the rules manager of the enterprise, a second new rule for the enterprise in response to a second triggering event;
publishing, by the rules manager, the second new rule via the pub/sub service;
after publication of the second new rule via the pub/sub service:
polling by the second rules engine, the pub/sub service for new rules;
upon determining by the second rules engine, from the polling, that the second new rule from the rules manager is for the second topic, downloading, by the second rules engine, the second new rule and storing, by the second rules engine, the second new rule in a second KIE container of a second RAM of the second rules engine; and
after storing the second new rule in the second KIE container of the second RAM, executing, by the second rules engine, the second new rule without downtime of the rules engine.

16. The method of claim 15, wherein each of the first and second rules comprises a DRL rule.

17. The method of claim 16, wherein the first rules engine comprises a first Drools rules engine and the second rules engine comprises a second Drools rules engine.

18. The method of claim 15, further comprising:
prior to downloading the first new rule, storing, by the first rules engine, in a first prior KIE container of the first RAM, a first prior instantiation of rules for the enterprise;
after storing the first new rule in the first KIE container of the first RAM of the first rules engine, deleting, by the first rules engine, the first prior KIE container;
prior to downloading the second new rule, storing, by the second rules engine, in a second prior KIE container of the first RAM, a second prior instantiation of rules for the enterprise; and
after storing the second new rule in the second KIE container of the second RAM of the second rules engine, deleting, by the second rules engine, the second prior KIE container.

19. The method of claim 14, wherein:
the enterprise is a financial services firm; and
the first new rule is to block transactions by a first client of the financial services firm for a first period of time.

20. The method of claim 14, wherein the rules manager is configured to publish the first and second new rules to the pub/sub service without addresses for the first and second rules engines.

21. The method of claim 14, further comprising:
prior to downloading the first new rule, storing, by the first rules engine, in a first prior KIE container of the first RAM, a first prior instantiation of rules for the enterprise; and
after storing the first new rule in the first KIE container of the first RAM of the first rules engine, deleting, by the first rules engine, the first prior KIE container.

\* \* \* \* \*